US012617084B2

(12) United States Patent
Fujita

(10) Patent No.: US 12,617,084 B2
(45) Date of Patent: May 5, 2026

(54) TRANSFER LEG AND ROBOT APPARATUS

(71) Applicant: FANUC CORPORATION, Yamanashi (JP)

(72) Inventor: Junya Fujita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 231 days.

(21) Appl. No.: 18/281,062

(22) PCT Filed: Apr. 15, 2021

(86) PCT No.: PCT/JP2021/015616
§ 371 (c)(1),
(2) Date: Sep. 8, 2023

(87) PCT Pub. No.: WO2022/219784
PCT Pub. Date: Oct. 20, 2022

(65) Prior Publication Data
US 2024/0083025 A1 Mar. 14, 2024

(51) Int. Cl.
B25J 9/16 (2006.01)
B25J 9/00 (2006.01)

(52) U.S. Cl.
CPC ........... B25J 9/1633 (2013.01); B25J 9/0009 (2013.01)

(58) Field of Classification Search
CPC .............................. B25J 9/0009; B25J 9/1633
USPC ........... 410/2, 46, 121; 414/807; 108/42, 48, 108/57.12, 90, 93, 96, 97, 106, 107, 150, 108/151, 154, 157.1, 158.12, 186, 187; 248/121, 127, 176.1, 309.1, 636, 637, 248/638, 674, 676, 678, 694; 74/490.01
See application file for complete search history.

(56) References Cited

U.S. PATENT DOCUMENTS

2018/0093378 A1 4/2018 Yamamoto et al.
2018/0133902 A1 5/2018 Inoue et al.

FOREIGN PATENT DOCUMENTS

JP 2018-51734 A 4/2018
JP 2018-080941 A 5/2018
JP 2020-196103 A 12/2020

OTHER PUBLICATIONS

International Search Report issued in PCT/JP2021/015616 mailed on Jun. 15, 2021 with English Translation (5 pages).
Written Opinion of the International Searching Authority issued in PCT/JP2021/015616 mailed on Jun. 15, 2021 with English Translation (7 pages).

*Primary Examiner* — T. Scott Fix
(74) *Attorney, Agent, or Firm* — Nakanishi IP Associates, LLC

(57) ABSTRACT

A robot apparatus according to one aspect of the present disclosure includes a robot body and a transfer leg for transferring the robot body. The robot body includes a robot arm mechanism and a sensor device for detecting an external force applied to the robot arm mechanism. The sensor device includes a sensor bottom plate to be installed on a robot installation table, a sensor top plate attached to the bottom surface of a base of the robot arm mechanism, and a sensor body for detecting the displacement between the sensor bottom plate and the sensor top plate. The transfer leg is configured to be able to fix the base or the sensor top plate to a transfer table in such a manner as to prevent the sensor bottom plate from coming into contact with the transfer table.

7 Claims, 12 Drawing Sheets

TRANSFER LEG AND ROBOT APPARATUS

TECHNICAL FIELD

Embodiments described herein relate generally to a transfer leg and a robot apparatus.

BACKGROUND ART

In recent years, highly safe collaborative robots that can work in cooperation with workers have begun to spread. Many collaborative robots are equipped with a sensor device for detecting an external force acting on the collaborative robot in order to detect a collision with a worker or the like. Patent Literature 1 discloses a robot with a sensor device interposed between the robot and a floor surface.

When a collaborative robot in which a robot arm mechanism is connected to the top of a sensor device is transferred, there are the following problems. In general, an industrial robot is fixed to a transfer pallet, a truck bed, or the like by a fixing tool such as a bolt by using a bolt hole for installation formed in a base of the robot. However, in this transfer method, an external force such as vibration generated during transfer is directly applied to the robot. The vibration during transfer is tens of times the acceleration of gravity and is far greater than the force applied when the robot is in normal operation. Therefore, the sensor device may be damaged during transfer.

As a method for preventing damage to the sensor device during transfer, it is conceivable to increase the rigidity of the sensor device so as not to be damaged even when an excessive external force is applied. It is also conceivable to fix the parts of the sensor device to each other with a fixing tool during transfer so that an excessive load is not applied to the sensor device main body even when an external force is applied.

If the rigidity of the main body (detection unit) of the sensor device is increased so that the sensor device is not damaged even when an excessive external force is applied, the main body of the sensor device will be difficult to deform. This not only decreases the detection accuracy of small forces, but also inevitably increases the costs of parts, increases the size of the sensor device, and increases the weight of the sensor device. In addition, in order to fix the parts constituting the sensor device to each other by a fixing tool, it is necessary to increase the dimensional accuracy of the fixing tool and to perform the fixing work carefully. If the parts are fixed in a misaligned state, an excessive force is applied to the sensor device. Increasing the dimensional accuracy of the fixing tool increases the costs of the parts, and carefully performing the fixing work increases the number of man-hours required for transfer.

CITATION LIST

Patent Literature

Patent Literature 1: Japanese Unexamined Patent Application Publication No. 2018-080941

DETAILED DESCRIPTION

A robot apparatus according to one aspect of the present disclosure includes a robot body and a transfer leg for transferring the robot body. The robot body includes a robot arm mechanism and a sensor device for detecting an external force applied to the robot arm mechanism. The sensor device includes a sensor bottom plate to be installed on a robot installation table, a sensor top plate attached to the bottom surface of a base of the robot arm mechanism, and a sensor body for detecting the displacement between the sensor bottom plate and the sensor top plate. The transfer leg is configured to be able to fix the base or the sensor top plate to a transfer table in such a manner as to prevent the sensor bottom plate from coming into contact with the transfer table.

Hereinafter, robot apparatuses according to embodiments of the present invention will be described with reference to the drawings.

First Embodiment

Figure 1:
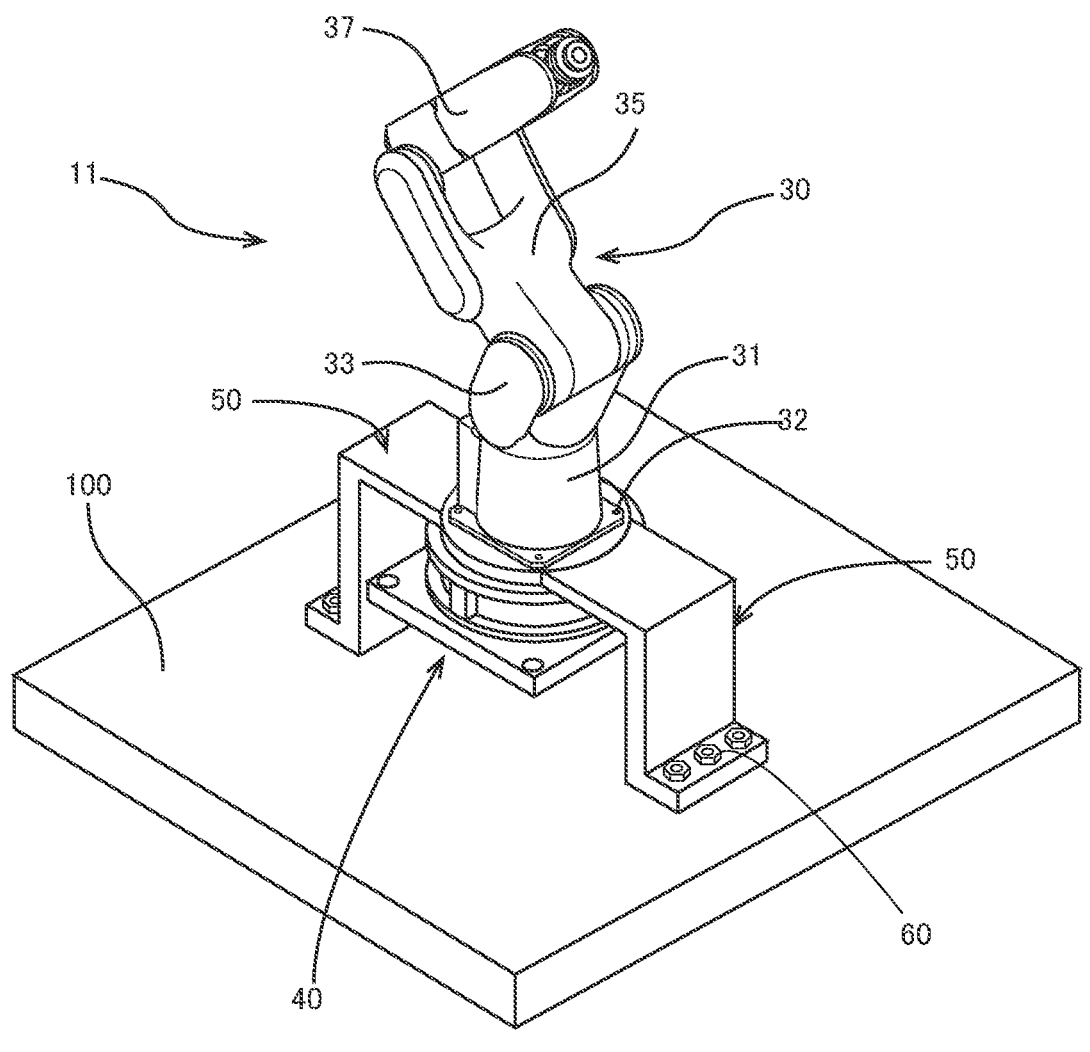
FIG. 1 is a perspective view showing a robot apparatus according to a first embodiment.

A robot apparatus according to a first embodiment includes a robot body 11 and a control device (not shown) that controls the robot body 11. As shown in FIG. 1, the robot body 11 includes a sensor device 40 fixed to a robot installation table, and a robot arm mechanism 30 connected to a top of the sensor device 40. The robot arm mechanism 30 includes a base 31, a first link 33 connected to the base 31 via a rotary joint, a second link 35 connected to the first link 33 via a rotary joint, and a third link 37 connected to the second link 35 via a rotary joint. An end effector is connected to the distal end of the third link 37 via a rotary joint. The base 31 has a bolt hole 32 for connecting to a sensor top plate 43 of the sensor device 40 by a bolt or the like.

The sensor device 40 detects an external force acting on the robot arm mechanism 30. Typically, a strain gauge type force sensor can be used as the sensor device 40. For example, the sensor device 40 has a sensor bottom plate 41 as a fixed portion that is fixed to an installation location by a fastener such as a bolt, a sensor top plate 43 arranged at a predetermined distance from the sensor bottom plate 41, and a pillar portion 45 as a connecting portion arranged between the sensor bottom plate 41 and the sensor top plate 43 and connecting the sensor bottom plate 41 and the sensor top plate 43 to each other. The sensor device 40 supports the robot arm mechanism 30. The base 31 is connected to the sensor top plate 43 by a fastener such as a bolt. The sensor top plate 43 and the sensor bottom plate 41 are made of a material, such as a hard resin or metal, which is not easily deformed by an external force. The pillar portion 45 is made of a material, such as an elastic resin, which is easily deformed by an external force. When an external force acts on the robot arm mechanism 30, the sensor top plate 43 is displaced with respect to the sensor bottom plate 41, and the pillar portion 45 is deformed by the displacement. A strain detector (not shown) is attached to the pillar portion 45 as a sensor body. The strain detector is deformed following the deformation of the pillar portion 45, changes its electric resistance, and outputs a voltage corresponding to the electric resistance to the control device. The control device can determine whether or not an external force has acted on the robot arm mechanism 30 by comparing the voltage value output from the sensor device 40 with a threshold value.

When the robot body 11 is transferred, the robot body 11 is placed on a transfer table 100 such as a transfer pallet or a truck bed. The robot apparatus has a pair of transfer legs 50 for fixing the robot body 11 to the transfer table 100 so that the robot body 11 does not move on the transfer table 100. One feature of the robot apparatus according to the first embodiment is that the transfer leg 50 functions not only as a member for fixing the robot body 11 to the transfer table 100, but also as a member for preventing the sensor device 40 from being damaged by an external force acting on the robot body 11 during transfer.

Specifically, the transfer leg 50 is configured such that a gap is formed between the robot body 11 and the transfer table 100, in other words, the sensor bottom plate 41 of the sensor device 40 is separated from the transfer table 100. This prevents the external force acting on the transfer table 100 from being directly transmitted to the pillar portion 45 of the sensor device 40 via the sensor bottom plate 41 of the sensor device 40. In addition, the transfer leg 50 is configured to be able to connect the transfer table 100 to a member provided closer to the distal end of the robot body 11 than the pillar portion 45. As a result, before the external force acting on the robot arm mechanism 30 is transmitted to the pillar portion 45 via the sensor top plate 43, the external force can be released to the transfer table 100 via the transfer leg 50, so that the load on the pillar portion 45 can be suppressed. Due to the inertia applied to the robot body 11 during transfer, a moment load is generated on the pillar portion 45 with the fixed position of the transfer leg 50 on the robot body 11 as a fulcrum. In order to reduce this moment load, it is desirable to fix the transfer leg 50 to a member disposed at a position close to the pillar portion 45 in the robot body 11.

Figure 2:
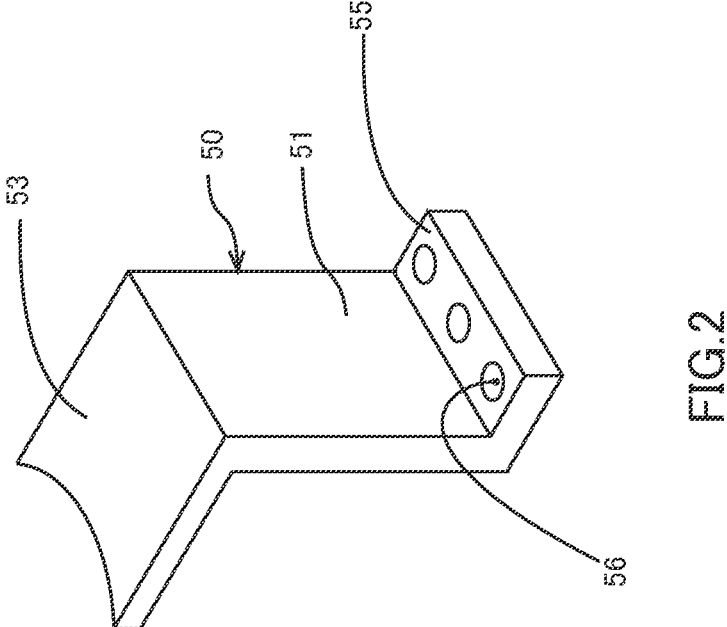
FIG. 2 is a perspective view showing a transfer leg of the robot apparatus according to the first embodiment.
Figure 3:
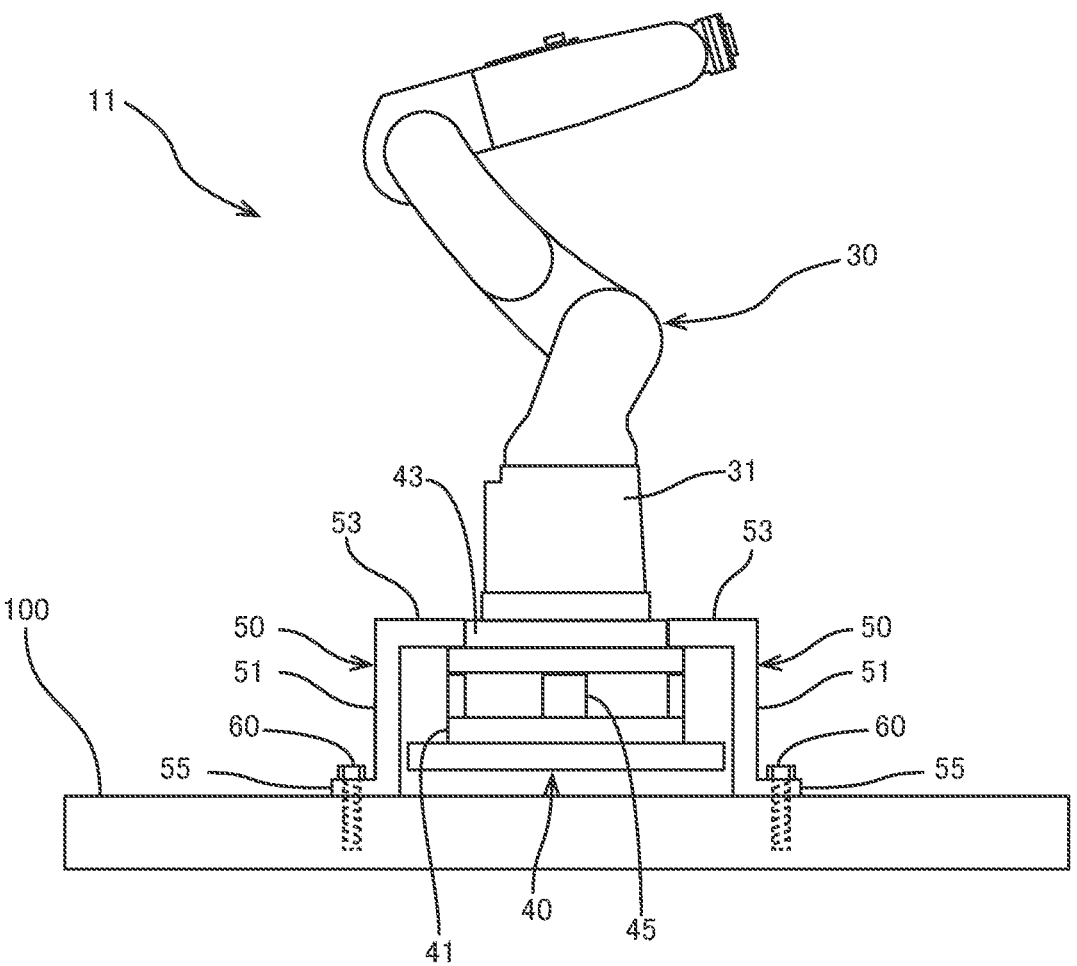
FIG. 3 is a side view showing a state where the robot apparatus shown in FIG. 1 is fixed to a transfer table.
Figure 4:
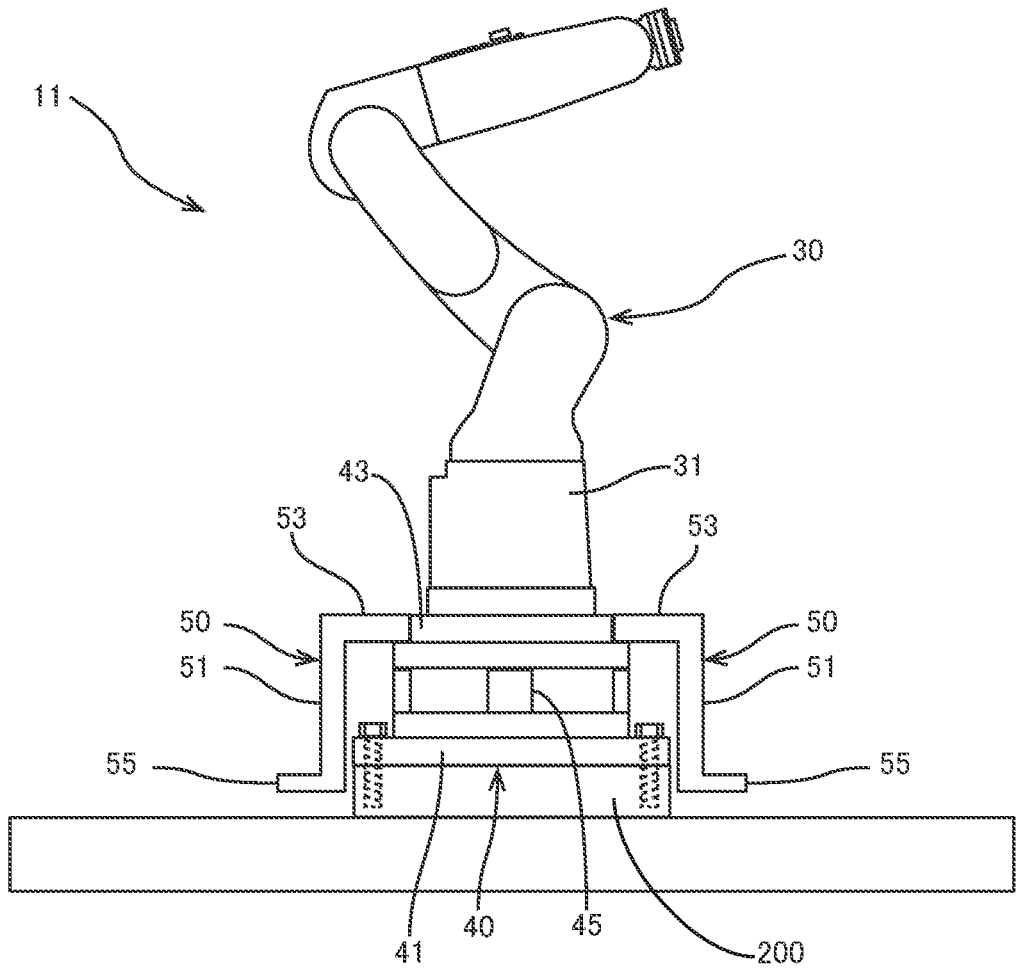
FIG. 4 is a side view showing a state where the robot apparatus shown in FIG. 1 is fixed to an installation table.

As shown in FIG. 1, the transfer leg 50 is integrally formed with the sensor top plate 43 of the sensor device 40. As shown in FIG. 2, the transfer leg 50 is formed in such a shape that both ends of a rectangular plate are bent 90 degrees in opposite directions. Its one end 53 is integrated with the sensor top plate 43, and the other end 55 has a bolt hole 56 for inserting a bolt 60. The transfer leg 50 is configured such that the height from its one end 53 to the other end 55 is longer than the height from the sensor bottom plate 41 to the sensor top plate 43 of the sensor device 40. The height of the transfer leg 50 corresponds to the length of a leg body 51 connecting one end 53 and the other end 55. Accordingly, as shown in FIG. 3, a gap can be formed between the sensor bottom plate 41 of the sensor device 40 and the transfer table 100 only by fixing the other end 55 of the transfer leg 50 to the transfer table 100, and the sensor bottom plate 41 can be separated from the transfer table 100. As shown in FIG. 4, when the robot body 11 is used, the robot body 11 is installed on a robot installation table 200 having a higher floor height than the surrounding part. Of course, a spacer may be interposed between the floor surface and the robot body 11 if the robot body 11 is installed on a place with a constant floor height. This allows the robot body 11 to be used in the same way as before, without the transfer leg 50 coming into contact with the floor surface.

The robot apparatus according to the first embodiment configured described above has the following effect. When the robot body 11 is directly installed on the transfer table 100, external forces of various directions and magnitudes are applied to the sensor bottom plate 41 fixed to the transfer table 100 and the sensor top plate 43 supporting the robot arm mechanism 30 due to vibration and inertia acting on the robot body 11 during transfer. Moreover, the direction of the external force applied to the sensor bottom plate 41 and the direction of the external force applied to the sensor top plate 43 do not always coincide with each other. In this case, an excessive force is applied to the pillar portion 45 connecting the sensor bottom plate 41 and the sensor top plate 43.

In the robot apparatus according to the first embodiment, the transfer table 100 and the sensor top plate 43 are fixed by the transfer leg 50 so that the robot body 11 is slightly lifted from the transfer table 100. That is, the robot arm mechanism 30 is supported only by the transfer leg 50. This allows the sensor device 40 to be in a state of being suspended from the robot arm mechanism 30, in other words, in a free state in which the sensor bottom plate 41 is not fixed anywhere, thus preventing an excessive force from being applied to the pillar portion 45. Of course, due to an external force acting on the robot body 11, a moment load is generated on the pillar portion 45 with the fixed position of the transfer leg 50 on the robot body 11 as a fulcrum. However, this moment load is very small compared to the load generated when the sensor bottom plate 41 and the sensor top plate 43 are connected to the transfer table 100 and the robot arm mechanism 30 as described above. Therefore, the load applied to the pillar portion 45 of the sensor device 40 during transfer can be reduced.

Second Embodiment

Figure 5:
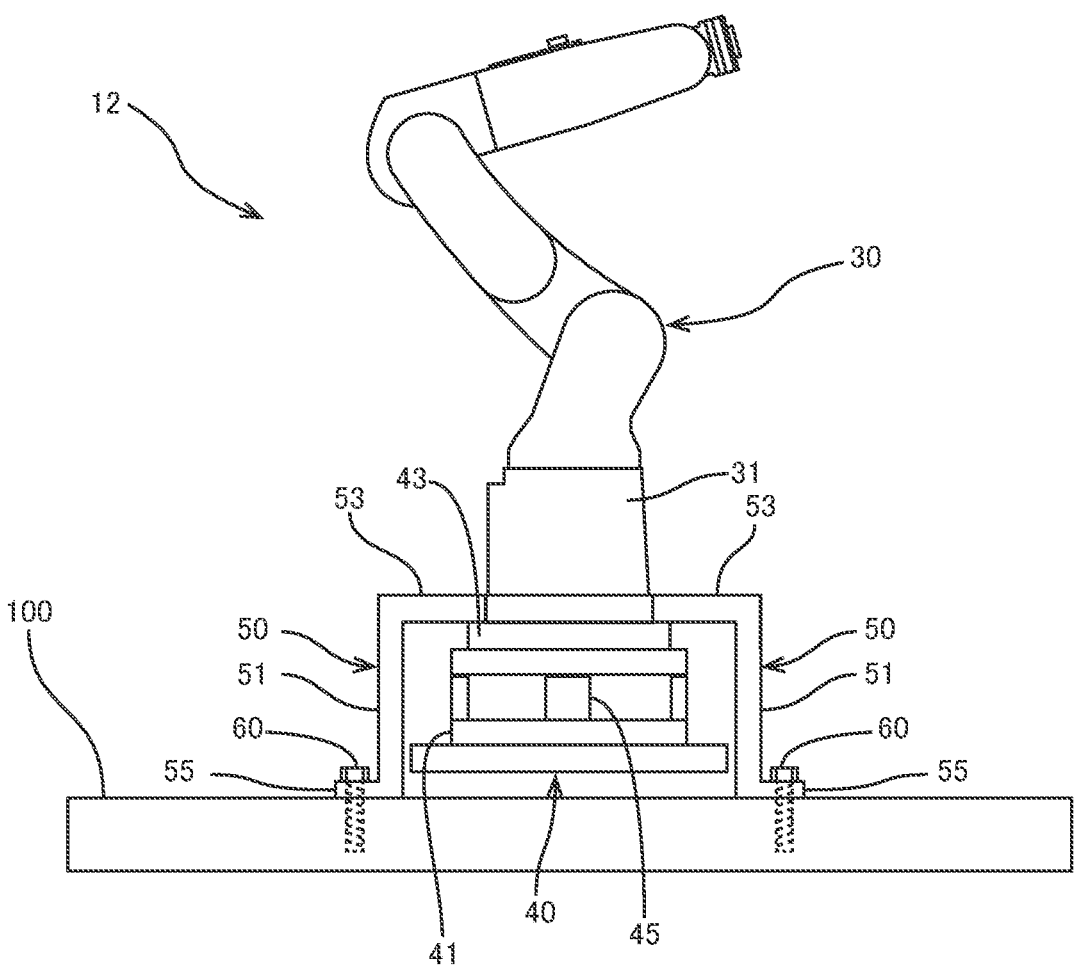
FIG. 5 is a side view showing a robot apparatus according to a second embodiment.

In the first embodiment, the transfer leg 50 is integrally formed with the sensor top plate 43 of the sensor device 40, but it may be integrally formed with the robot arm mechanism 30. As shown in FIG. 5, in a second embodiment, the transfer leg 50 which supports a robot body 12 with respect to the transfer table 100 is integrally formed with the base 31 of the robot arm mechanism 30. According to the robot apparatus according to the second embodiment configured in this way, the load applied to the pillar portion 45 of the sensor device 40 during transfer can be reduced, as in the robot apparatus according to the first embodiment.

In general, the base 31 of the robot arm mechanism 30 is larger than the sensor top plate 43 of the sensor device 40. From the viewpoint of freedom of design, the configuration in which the transfer leg 50 is integrally formed with the base 31 of the robot arm mechanism 30 is superior to the configuration in which the transfer leg 50 is integrally formed with the sensor top plate 43 of the sensor device 40. Meanwhile, the transfer leg 50 of the robot apparatus according to the first embodiment is connected to a position closer to the pillar portion 45 of the sensor device 40 than the transfer leg 50 of the robot apparatus according to the second embodiment. A moment load corresponding to the distance from the position where the transfer leg 50 is fixed is generated on the pillar portion 45 of the sensor device 40. Therefore, from the viewpoint of further reducing the load applied to the pillar portion 45 of the sensor device 40, the robot apparatus according to the first embodiment is superior to the robot apparatus according to the second embodiment.

Third Embodiment

Figure 6:
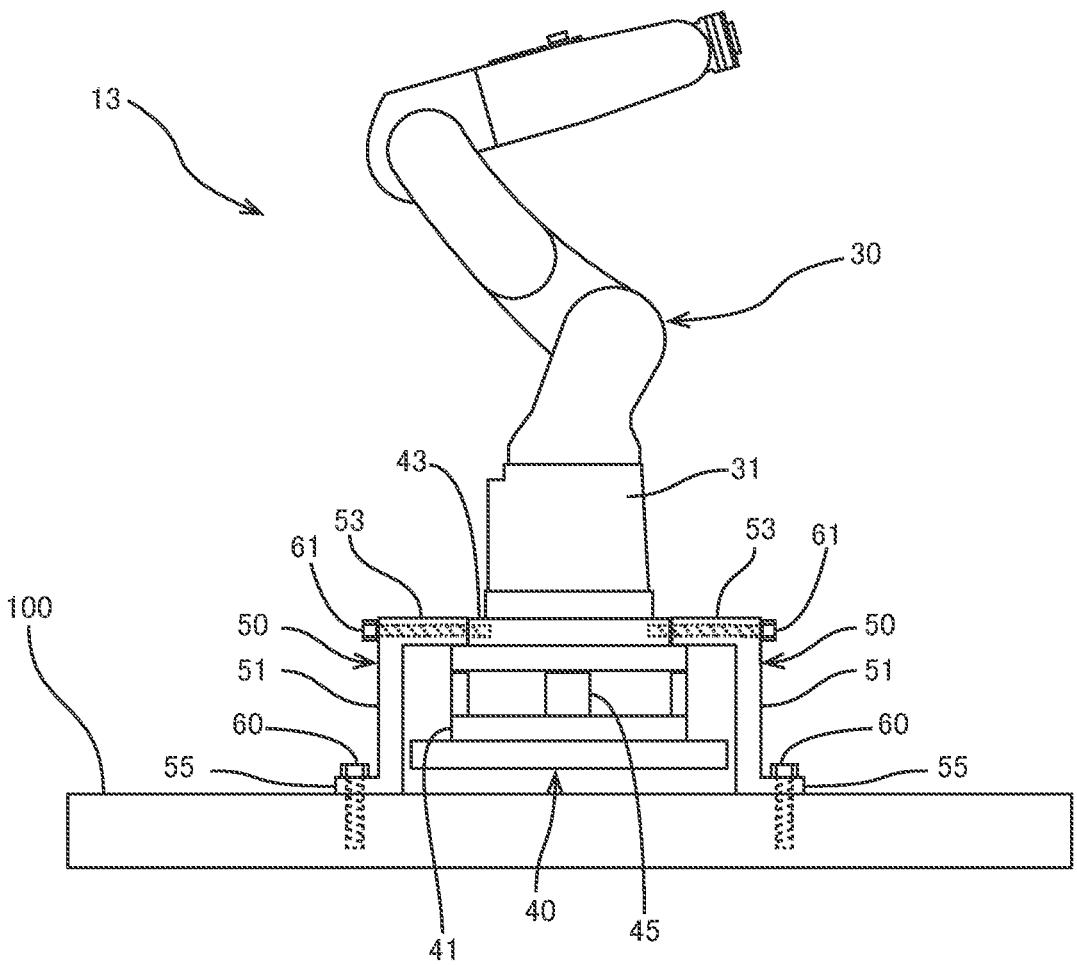
FIG. 6 is a side view showing a robot apparatus according to a third embodiment.

In the first and second embodiments, the transfer leg is integrally formed with the robot body, but it may be detachably attached to the robot body. As shown in FIG. 6, in a robot apparatus according to a third embodiment, the transfer leg 50 is detachably attached to a robot body 13. A bolt hole is formed along the horizontal direction in each of one end 53 of the transfer leg 50 and the sensor top plate 43. The transfer leg 50 is fastened to the sensor top plate 43 by a bolt 61 inserted along the horizontal direction. The "horizontal direction" corresponds to a direction parallel to the transfer surface (front surface) of the transfer table 100.

In the robot apparatuses according to the first and second embodiments, the transfer leg 50 is integrally formed with the robot body 11, 12, so that the transfer leg 50 occupies a large area of the robot apparatus. In the robot apparatus according to the third embodiment, the transfer leg 50 is detachably attached to the robot body 13, so that the transfer leg 50 needs to be attached to the robot body 13 only when the robot body 13 is transferred. When the robot apparatus is used, the transfer leg 50 can be removed from the robot body 13. As a result, the installation area of the robot apparatus can be reduced compared to the case where the transfer leg 50 is integrally formed with the robot body 13, and the robot apparatus can be installed on a floor surface with a constant floor height. According to the robot apparatus of the third embodiment, the load applied to the pillar portion 45 of the sensor device 40 during transfer can be reduced, and the degree of freedom of installation of the robot apparatus can be improved compared to the robot apparatuses of the first and second embodiments.

Fourth Embodiment

Figure 7:
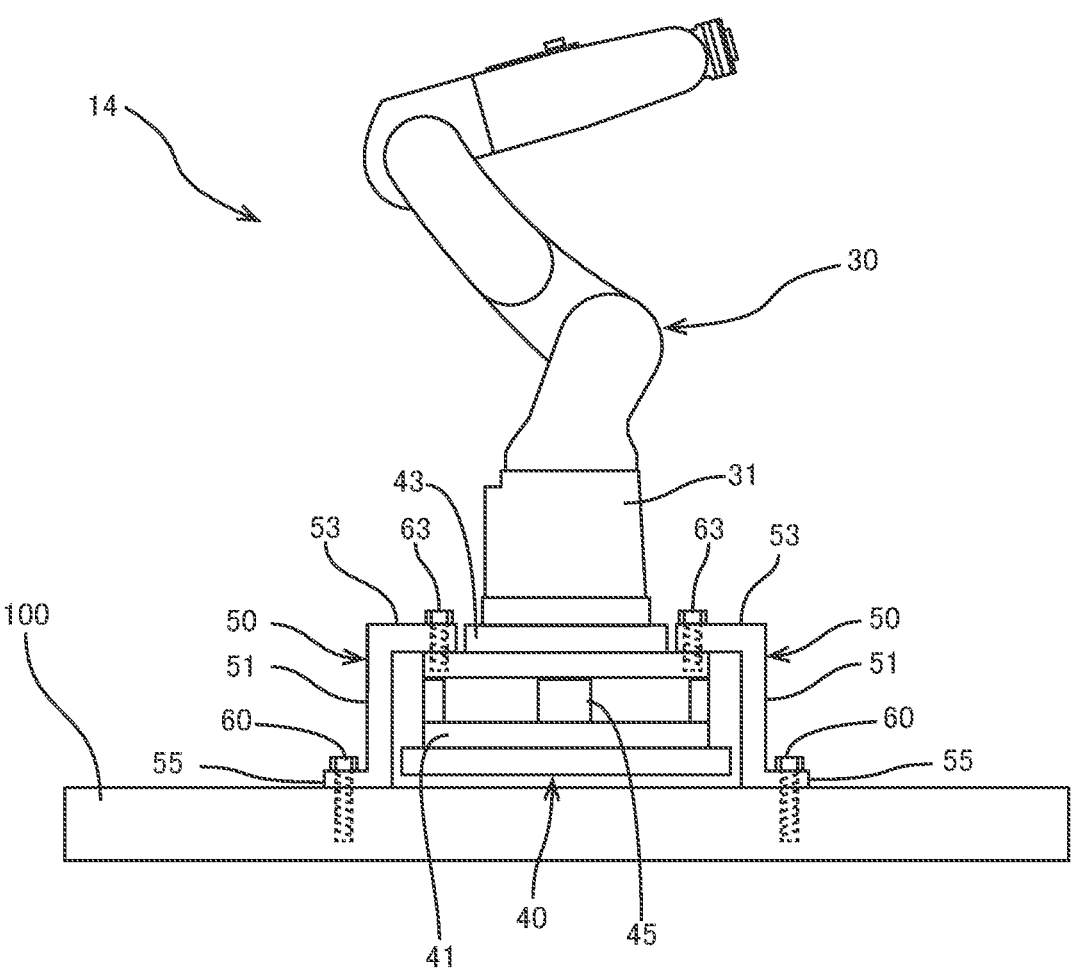
FIG. 7 is a side view showing a robot apparatus according to a fourth embodiment.

In the third embodiment, the transfer leg 50 and the sensor top plate 43 are fastened to each other by the bolt 61 inserted in the horizontal direction, but the direction in which the bolt is inserted is not limited to this. As shown in FIG. 7, the transfer leg 50 and the sensor top plate 43 of a robot apparatus according to a fourth embodiment are fastened to each other by a bolt 63 inserted along the vertical direction. A bolt hole is formed along the vertical direction in each of one end 53 of the transfer leg 50 and the sensor top plate 43. The "vertical direction" corresponds to a direction orthogonal to the transfer surface (front surface) of the transfer table 100.

Figure 8:
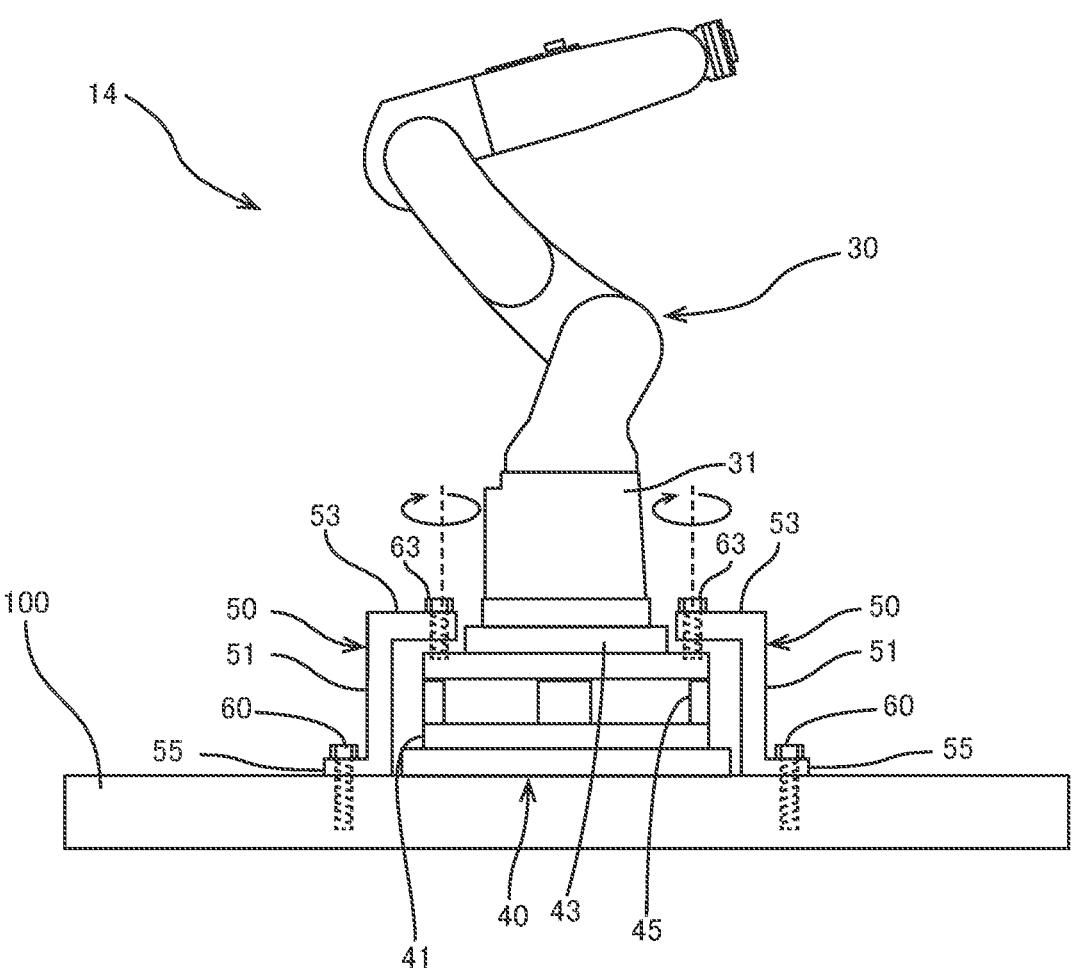
FIG. 8 illustrates a method for fixing the robot apparatus shown in FIG. 7 to the transfer table.

The robot apparatus according to the fourth embodiment has the same effect as the robot apparatus according to the third embodiment. Further, in the third embodiment, since the bolt is inserted in the horizontal direction, it is necessary to lift the robot body 13 by a crane or the like in order to fix the robot body 13 to the transfer table 100. With the robot body 13 lifted, the transfer leg 50 is attached, the robot body 13 to which the transfer leg 50 has been attached is lowered onto the transfer table 100, and the transfer leg 50 is fixed to the transfer table 100. In the fourth embodiment, since the bolt 63 is inserted in the vertical direction, in order to fix the robot body 14 to the transfer table 100, it is only necessary that, with the robot body 11 placed on the transfer table 100, the transfer leg 50 is fixed to the transfer table 100, and the bolt 63 is inserted along the vertical direction into the transfer leg 50 fixed to the transfer table 100 and a robot body 14, and then tightened, as shown in FIG. 8. Since the transfer leg 50 is fixed to the transfer table 100, when the transfer leg 50 and the robot body 14 are fastened by the bolt 63, the robot body 11 is moved toward the transfer leg 50, that is, upward in the vertical direction by the axial force of the bolt 63, and the robot body 14 can be separated from the transfer table 100.

As described above, from the viewpoint of ease of installation of the robot body 14 on the transfer table 100, the robot apparatus according to the fourth embodiment is superior to the robot apparatus according to the third embodiment in that a large machine such as a crane is not required for the work of fixing the robot body 14 to the transfer table 100, and only the work of fastening with the bolts 60, 63 is required. On the other hand, in the configuration of the third embodiment, since the bolt hole may be formed along the horizontal direction, the bolt hole can be formed in the side surface of the sensor top plate 43 by making the thickness of the sensor top plate 43 thicker than the bolt hole, for example. In the configuration of the fourth embodiment, since the bolt hole must be formed along the vertical direction, for example, the width and length of the sensor top plate 43 must be larger than those of the base 31 of the robot arm mechanism 30. Therefore, from the viewpoint of the area occupied by the robot body, the robot apparatus according to the third embodiment is superior to the robot apparatus according to the fourth embodiment.

Fifth Embodiment

Figure 9:
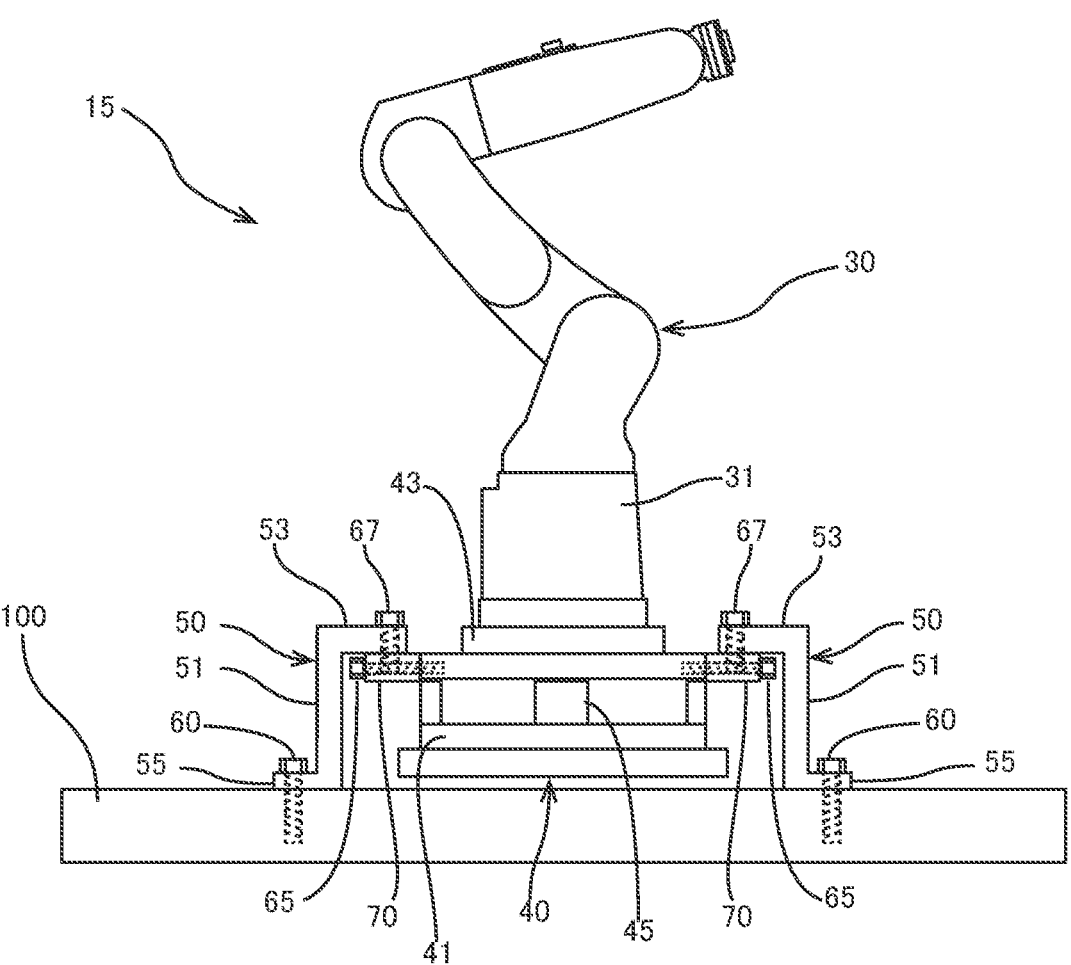
FIG. 9 is a side view showing a robot apparatus according to a fifth embodiment.

In the fourth embodiment, since the transfer leg 50 is directly attached to and detached from the sensor top plate 43, the sensor top plate 43 must be made large in order to allow the transfer leg 50 to be attached thereto, and the area occupied by the robot body 14 is large. In order to solve this problem, another member may be interposed between the transfer leg 50 and the sensor top plate 43. As shown in FIG. 9, a robot apparatus according to a fifth embodiment further includes an auxiliary transfer member 70 detachably attached to the sensor top plate 43. The auxiliary transfer member 70 is fixed to the sensor top plate 43 by a bolt 65 inserted in the horizontal direction. The transfer leg 50 is fixed to the auxiliary transfer member 70 by a bolt 67 inserted along the vertical direction. According to the robot apparatus of the fifth embodiment, the load applied to the pillar portion 45 of the sensor device 40 during transfer can be reduced, and the sensor top plate 43 does not need to be made large compared to the robot apparatus of the fourth embodiment, and the area occupied by the robot body 15 can be reduced. However, since the number of attached parts is increased, the robot apparatus according to the fourth embodiment is superior to the robot apparatus according to the fifth embodiment in terms of work man-hours.

Sixth Embodiment

In the first to fifth embodiments, the height of the transfer leg 50 from the position where the transfer leg 50 is attached to the transfer table 100 to the position where the transfer leg 50 is attached to the robot body is longer than the height from the sensor bottom plate 41 of the sensor device 40 to the position where the transfer leg 50 is attached to the robot body, and the sensor bottom plate 41 can be separated from the transfer table 100 by the height of the transfer leg 50.

However, a bolt for fixing the transfer leg 50 to the transfer table 100 may be used to function as a jack (activator).

Figure 10:
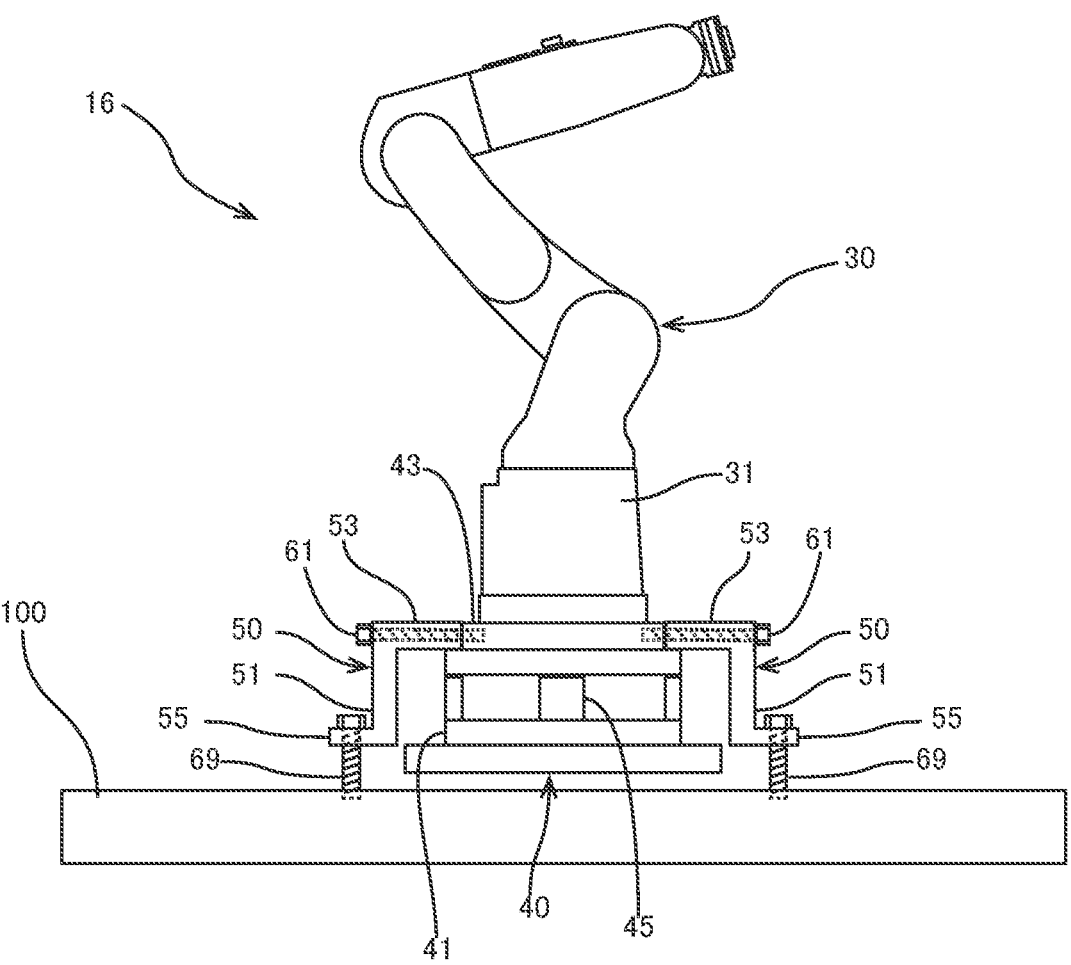
FIG. 10 is a side view showing a robot apparatus according to a sixth embodiment.
Figure 11:
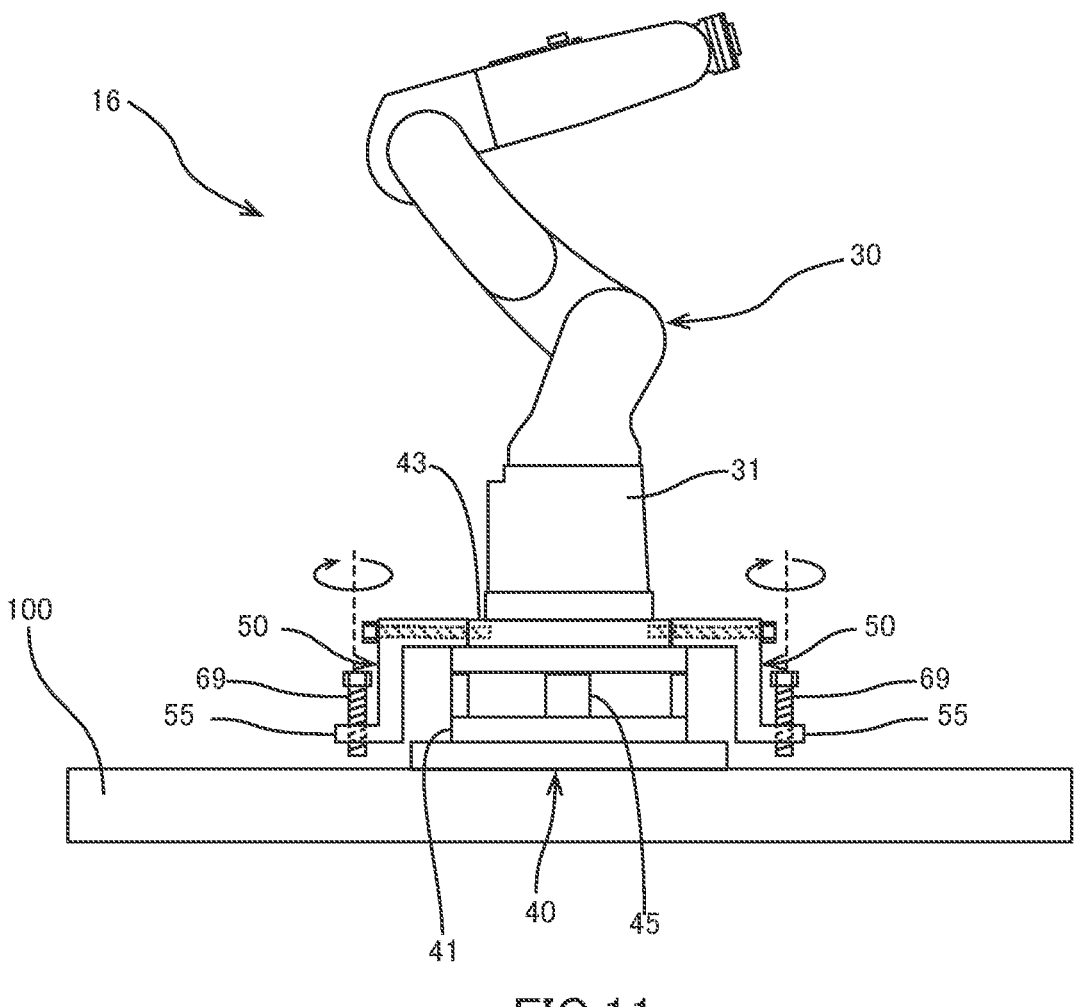
FIG. 11 illustrates a method for fixing the robot apparatus shown in FIG. 10 to the transfer table.

As shown in FIG. 10, the transfer leg 50 of a robot apparatus according to a sixth embodiment is configured such that the height from its one end 53 to the other end 55 is slightly shorter than the height from the sensor bottom plate 41 to the sensor top plate 43 of the sensor device 40. As shown in FIG. 11, even in a state where a robot body 16 to which the transfer leg 50 is attached is placed on the transfer table 100, the transfer leg 50 can be prevented from coming into contact with the transfer table 100. When a bolt 69 is inserted into the transfer leg 50 attached to the robot body 11 and the transfer table 100 and tightened, the tip of the bolt 69 abuts against the transfer table 100. When the bolt 69 is further tightened, the robot body 16 is lifted upward in the vertical direction together with the transfer leg 50 by the axial force of the bolt 69, and the robot body 16 can be separated from the transfer table 100. The robot body 16 separated from the transfer table 100 is fixed to the transfer table 100 by a fixing member such as a belt. Of course, the robot body 16 can be fixed to the transfer table 100 by forming a shallow bolt hole in the transfer table 100 and screwing the tip of the bolt 69 into the bolt hole formed in the transfer table 100. According to the robot apparatus according to the sixth embodiment, the load applied to the pillar portion 45 of the sensor device 40 during transfer can be reduced, and as in the robot apparatus according to the fourth embodiment, a large machine such as a crane is not required for the work of fixing the robot body 11 to the transfer table 100, and only the work of fastening the bolt is required, so the robot body 16 can be easily installed on the transfer table 100.

Seventh Embodiment

Although the robot bodies of the robot apparatuses according to the first to sixth embodiments have a configuration in which the robot arm mechanism 30 is connected to the top of the sensor device 40, the transfer leg 50, which is one of the features of the robot apparatuses according to the first to sixth embodiments, can be applied to robot bodies other than the robot bodies having the above configuration.

In order to protect the internal parts of the robot arm mechanism 30 from external forces acting during transfer, the size and shape of the transfer leg 50 are determined so that its one end 53 is fixed to a member of the robot arm mechanism 30 closer to the distal end than the part to be protected in the robot arm mechanism 30, the other end 55 is fixed to the transfer table 100, and the robot arm mechanism 30 can be separated from the transfer table 100.

Figure 12:
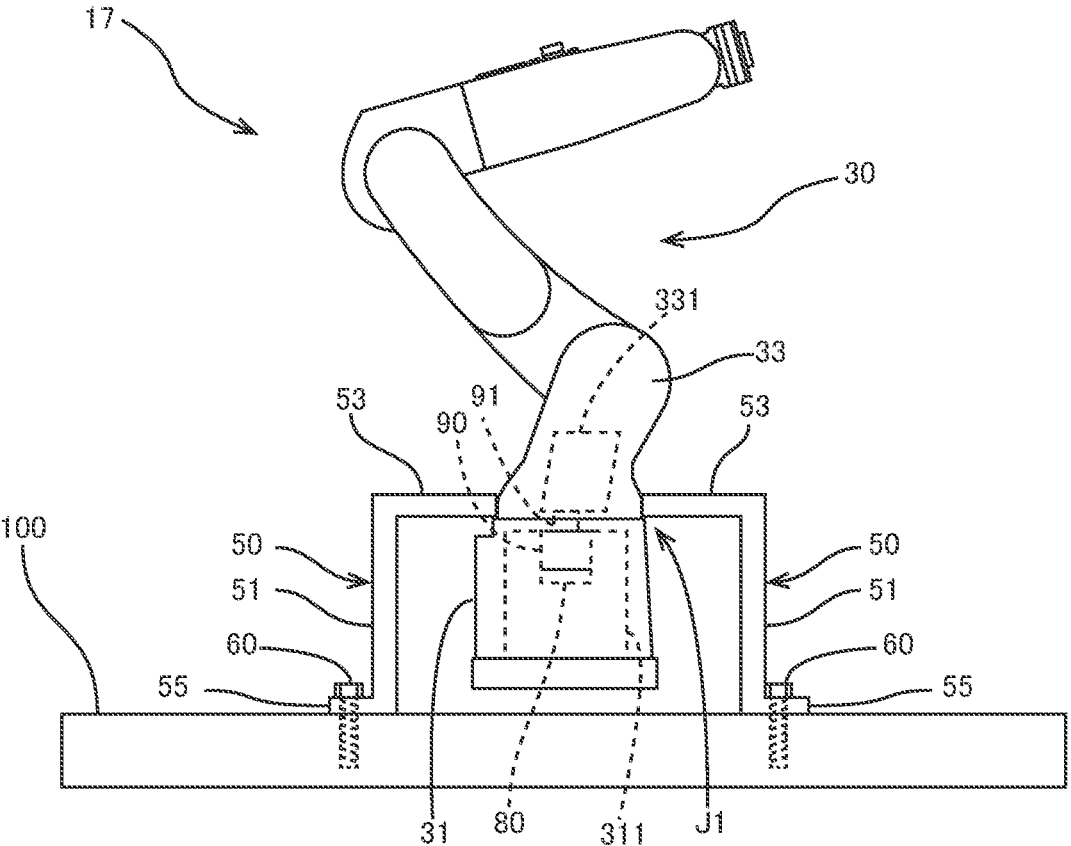
FIG. 12 is a side view showing a robot apparatus according to a seventh embodiment.

As shown in FIG. 12, a robot apparatus according to a seventh embodiment includes a torque sensor 80. The torque sensor 80 is provided in a motor unit 90 that drives a joint J1 connecting the base 31 and the first link 33. The motor unit 90 is fixed to a frame 311 of the base 31, and the output shaft 91 of the motor unit 90 is fixed to a frame 331 of the first link 33. The transfer leg 50 is fixed to the first link 33 at one end 53, and fixed to the transfer table 100 at the other end 55. The transfer leg 50 is configured such that the height from its one end 53 to the other end 55 is longer than the height from the bottom surface of the base 31 of the robot arm mechanism 30 to the attachment position of the transfer leg 50. The base 31 of the robot arm mechanism 30 is separated from the transfer table 100 by the transfer leg 50 configured as described above.

According to the robot apparatus of the seventh embodiment configured as described above, since the distal end side of the robot arm mechanism 30 with respect to the torque sensor 80 is supported by the transfer leg 50, it is possible to suppress the direct transmission of the external force acting on the transfer table 100 to the torque sensor 80 via the base 31 of the robot arm mechanism 30 and suppress the transmission of the external force acting on the robot arm mechanism 30 to the torque sensor 80 via the first link 33, thereby reducing the load applied to the torque sensor 80.

In the present embodiment, there is a pair of transfer legs 50, but the number of transfer legs 50 is not limited to two. In addition, as long as the transfer leg 50 and the robot body can be fastened to each other, or the transfer leg 50 and the transfer table 100 can be fastened to each other, the means therefor is not limited to a bolt. For example, depending on the embodiment, the fastening means may be a screw, a belt, or the like.

In addition, one end 53 of the transfer leg 50 is attached to the sensor top plate 43 of the sensor device 40 or the base 31 of the robot arm mechanism 30, and the other end 55 thereof is attached to the transfer table 100. However, as long as the sensor bottom plate 41 can be separated from the transfer table 100 by the transfer leg 50, the attachment position of the other end 55 is not limited to this. For example, the other end 55 of the transfer leg 50 may be attached to a member fixed to the transfer table 100 of the truck bed, for example, not to the surface of the transfer table 100.

While some embodiments of the present invention have been described, these embodiments have been presented as examples, and are not intended to limit the scope of the invention. These embodiments can be implemented in various other forms, and various omissions, replacements, and changes can be made without departing from the spirit of the invention. These embodiments and their modifications are included in the scope and spirit of the invention and are included in the scope of the claimed inventions and their equivalents.

The invention claimed is:

1. A robot apparatus comprising:
   a robot body including a robot arm mechanism and a sensor device configured to detect an external force applied to the robot arm mechanism; and
   a transfer leg for fixing the robot body to a transfer table, wherein
   the sensor device includes a sensor bottom plate to be installed on a robot installation table, a sensor top plate attached to a bottom surface of a base of the robot arm mechanism, and a sensor body configured to detect a displacement between the sensor bottom plate and the sensor top plate,
   the transfer leg is configured to be able to connect the base or the sensor top plate to the transfer table in such a manner that the sensor bottom plate is floated relative to the transfer table,
   the robot body and the transfer table are connected only via the transfer leg, and
   the transfer leg has a height longer than a height from the sensor bottom plate to the base or a height from the sensor bottom plate to the sensor top plate, with one end connected to the base or the sensor top plate and another end connected to the transfer table, whereby the sensor bottom plate is separated from the transfer table and a gap is formed between the sensor bottom plate and the transfer table.

2. The robot apparatus according to claim 1, wherein the transfer leg is configured to be detachably attached to the base or the sensor top plate.

3. The robot apparatus according to claim 2, wherein the transfer leg is attached to the base or the sensor top plate by a first bolt inserted in a direction orthogonal to the transfer table, and the robot body is separated from the transfer table by an axial force of the first bolt, thereby forming a gap between the sensor bottom plate and the transfer table.

4. The robot apparatus according to claim 1, wherein the transfer leg is attached to the base or the sensor top plate by a first bolt inserted in a direction parallel to the transfer table.

5. A robot apparatus comprising:

a robot body including a robot arm mechanism and a sensor device configured to detect an external force applied to the robot arm mechanism; and a transfer leg for fixing the robot body to a transfer table, wherein the sensor device includes a sensor bottom plate to be installed on a robot installation table, a sensor top plate attached to a bottom surface of a base of the robot arm mechanism, and a sensor body configured to detect a displacement between the sensor bottom plate and the sensor top plate, the transfer leg is configured to be able to connect the base or the sensor top plate to the transfer table in such a manner that the sensor bottom plate is floated relative to the transfer table, the robot body and the transfer table are connected only via the transfer leg, the transfer leg has a height that is shorter than a height from the sensor bottom plate to the base or a height from the sensor bottom plate to the sensor top plate, one end of the transport leg is connected to the base or the sensor top plate by a first bolt, another end of the transport leg is connected to the transport table by a second bolt inserted in a direction orthogonal to the transport table, and when the second bolt is tightened so that a tip of the second bolt abuts against the transport table, the robot body is separated from the transport table, thereby forming a gap between the sensor bottom plate and the transport table.

6. The robot apparatus according to claim 5, wherein the transfer leg is attached to the base or the sensor top plate by a first bolt inserted in a direction parallel to the transfer table.

7. The robot apparatus according to claim 5, wherein the transfer leg is integrally formed with the base or the sensor top plate.

\* \* \* \* \*